Jan. 24, 1961 G. L. JONES 2,969,265
BEARING CONSTRUCTION FOR GYROSCOPES AND LIKE INSTRUMENTS
Filed Oct. 24, 1958
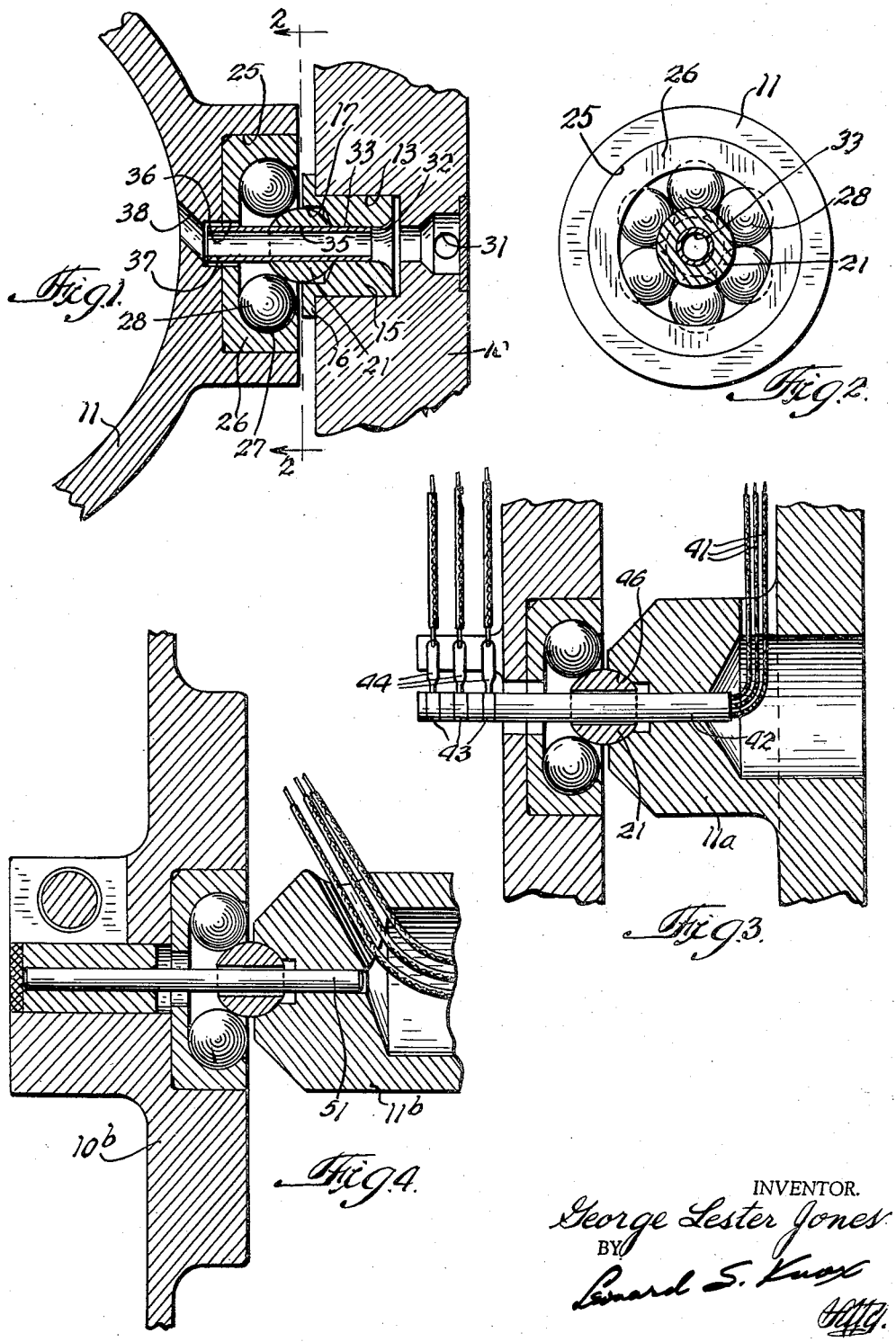
INVENTOR.
George Lester Jones
BY United States Patent Office 2,969,265
Patented Jan. 24, 1961

2,969,265

BEARING CONSTRUCTION FOR GYROSCOPES AND LIKE INSTRUMENTS

George Lester Jones, R.R. 2, Marne, Mich.

Filed Oct. 24, 1958, Ser. No. 769,426

3 Claims. (Cl. 308—194)

This invention relates to an improved bearing for gyroscopes and other instruments wherein the running clearances and friction must be a practically irreducible minimum.

In the art of gyroscopes and gyroscopic instruments, it is well known that torque exerted by bearing friction and lack of alignment due to excessive clearances can introduce errors of precession thereby interfering with the basic operation of a gyroscope namely, that of providing an absolute reference in space. While some measure of drift due to bearing deficiencies may be tolerated it is necessary that the departure of the gyroscope from a predetermined reference be regarded as a pure function of defined displacing forces acting in defined directions and, therefore, when drift is to be reckoned with, the effect thereof on the system of which the gyroscope forms a part must be anticipated and corrected for accordingly. With the advent of guided missiles the demand for greater accuracy in the response of gyroscopes has taken an increased importance as the effect of drift may introduce errors which may be translated into a "miss" of several miles at the target. Even though drift is composed of several factors a predominant one is bearing friction and run-out due to excessive clearance in the bearings. If a bearing is not sufficiently accurate in the fit of its several parts attempts are made to reduce the play by take-up means which only aggravate the condition, since the error due to eccentricity is then converted into friction.

My invention has, therefore, as its principal object the provision of a bearing capable of being manufactured with far greater accuracy than prior bearings.

Another object is to provide a bearing as aforesaid wherein the pivot forming the end of the shaft which the bearing supports is so configured as to substantially eliminate dimensional changes due to cold working of the parts.

Still another object is to provide a bearing in which play may be reduced by adjustment but without any appreciable proportionate increase in the friction.

Another object is to provide a bearing as aforesaid wherein a pivot part supported on antifriction balls may be axially bored for the passage of various members, e.g. a tube conducting compressed air for driving the rotor and for other purposes.

An additional object is to provide a bearing as aforesaid for a rate gyroscope which will permit the passage axially therethrough of the elongated, torsionally deformable element currently employed for biasing the gimbal with respect to the frame and which will, concurrently, relieve the element from the weight of the gimbal and the parts carried thereby.

Another object is to provide a bearing as aforesaid capable of axially accommodating a plurality of electrical conductors forming connections between one gimbal and another gimbal or the frame of the gyroscope.

Other objects and advantages of the invention will become apparent from the ensuing description which, taken with the accompanying drawing, discloses certain preferred embodiments of the invention.

In this drawing:

Fig. 1 is an axial cross section of a bearing in accordance with the invention;

Fig. 2 is a cross section taken on the line 2—2 of Fig. 1;

Fig. 3 is a view similar to Fig. 1 of an alternative embodiment; and

Fig. 4 is a view similar to Fig. 1 of another alternative.

Broadly regarded the invention comprises a mounting on one of the relatively rotatable parts to receive a male bearing member provided with a spherical surface and a race on the other of the parts carrying an annular array of balls supporting the male member together constituting an anti-friction bearing. At this juncture it should be noted that where herein one of the parts which the bearing serves is referred to as the fixed part and the other as the rotatable part these terms are intended to be relative since their functions, as concerns the environment of the invention, are interchangeable. Moreover the term "rotatable" is intended to comprehend movement about an axis over small angles in both directions from a zero position, as would be the case in a rate gyroscope. The spherical surface of the male member is tangential to the plurality of balls and is of such radius as to transmit the load of the rotatable part to the balls and thence to the race for optimum support and degree of wear. Any suitable means may be provided for endwise adjustment to reduce the running clearances to a minimum consistent with minimum friction. Thus the support between the spherically-surfaced member and the balls is constituted as the several points of tangency of one spherical surface with a plurality of other, identical spherical surfaces. The circle of centers of the plurality of balls and their diameter, and the diameter of the contacting spherical surface are all so selected as to define an internal clearance space for passage of elements passing axially through the bearing, e.g. a tube carrying compressed air, a plurality of electrical conductors, a gimbal biasing element, etc. The invention bearing also enables rapid assembly and disassembly of the two relatively rotatable parts without the need of dislodging press-fitted parts and the hazard of deformation such step entails. Moreover the invention bearing, by reason of the tangential relation between the spherical member and balls is self-aligning.

Adverting to the drawing I have shown, by way of example, several modes of carrying the invention into practice as applied particularly to gyroscopes. In Fig. 1 there is shown a portion of a fixed frame 10 which may, alternatively, be regarded as a movable gimbal, together with a portion of a gimbal 11. It will be understood that the representation of Fig. 1 is of one bearing and that its companion bearing is axially aligned therewith. A recess 13 is formed in the frame 10 to receive, in a press fit, a seat 15 provided with a limiting flange 16. The outer end of the seat 15 is bored at 17 to receive the element 21 which may be a true sphere or provided with a spherical zone at the working region. This latter is preferably inserted into the bore 17 with a light press fit in order to avoid deformation thereof and merely to retain the same against falling out when the parts are in stages of disassembly. Although, for convenience, the element 21 is shown as a sphere it will be understood that only a portion thereof exposed beyond the seat 15 partakes in the bearing function. Accordingly that portion of the element within the seat 15 may be otherwise formed, e.g. cylindrical, whereby to position an axial hole through the element.

The gimbal 11 is provided with a cylindrical recess 25 into which a race 26 is press fitted. Race 26 has a segmentally toroidal groove 27 to receive, in rolling relation, a plurality of balls 28 with which the spherical surface of the element 21 is in rolling contact. The diameter of the balls 28 and of the spherical surface of the element 21 are so selected as to provide a force component on each ball in a direction accommodating both radial and axial thrust, e.g. a component at an angle of 60° to the axis of rotation of the gimbal 11. If it is desired to provide greater accommodation of radial thrust than axial thrust or vice versa the relative radii of the spherical surface of the element 21 and of the balls 28 are modified accordingly to shift the circle of tangent points and therefore the direction of the resultant force components through that circle. Thus the invention bearing affords great flexibility in its application without affecting the principles involved or the function thereof. It will be understood, of course, that the spherical element and the balls are of hardened steel or equivalent such as tungsten carbide.

The invention bearing possesses important utility where it is desired to provide a passage through the bearing for a driving medium, e.g. compressed air or air under suction. For example, in Fig. 1, compressed air is to be admitted to a chamber enclosing the gyroscope rotor from a source exterior to the frame 10. Accordingly, assuming the source to be a port 31, the seat 15 is bored at 32 to receive a feed tube 33 which then passes through a bore 35 in the element 21, thence through clearance holes 36 and 37 in the race 26 and gimbal 11 to terminate close to a port 38 feeding to the rotor enclosure (not shown). The bore 35 may receive the tube 33 with a loose or tight fit as desired. The end of the tube 33 may be terminated at the port 38 with only running clearance remaining. Thus compressed air may be conducted through the bearing without, in any way, affecting the basic organization thereof.

Another embodiment of the invention is seen in Fig. 3 which, while different in minor details of construction, includes the bearing components described in connection with Fig. 1. In this case electrical components carried on the gimbal 11a are fed by or feed to, a plurality of conductors 41 which are passed through a protecting and guiding tube 42 of electrically-insulating or other material similar to the tube 33. At its outer end the tube 42 carries a plurality of suitably insulated slip rings 43 upon which a plurality of brushes 44 may wipe. In this example it is to be observed that the element 21 is spherical and is received on a seat 46 which is a spherical zone congruent with the surface of the element 21. If desired the latter may be sweated to its seat while held aligned by a suitable mandrel.

A further form of the invention is shown in Fig. 4 wherein the bearing supports the gimbal 11b of a rate gyroscope. In this instrument the gimbal 11b is permitted only an oscillating movement through small angles of displacement and is restored to zero by means of a torsionally deformable rod or wire 51 fixed at its ends in the frame 10b and gimbal 11b respectively, as is understood in this art. Since, in most cases, the rod or wire 51 is, in general, incapable of carrying the weight of the gimbal, rotor and the parts appertaining thereto separate bearings are provided. The invention bearing is ideally suited to this environment since the rod or wire 51 may be passed axially therethrough as explained hereinabove. In this way the rod or wire 51 is not called upon to carry either radial or axial thrust and may therefore perform its basic function as a restoring spring independently of extraneous forces.

It has been found that the invention bearing has minimum friction at a clearance of from 0.000025" to 0.000050" as compared to 0.0003" for a conventional ball bearing. Thus precessive errors due to weight shift are substantially reduced.

Inasmuch as the dimension of the element 21 are, in practice, extremely small, say ¼" in diameter, I have found that the diametrical bore therethrough, when required, may be obtained best by the method of electrolytic decomposition which is without adverse effect on the sphericity or the hardened surface of the element.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. A bearing assembly for supporting a rotatable part on a relatively fixed part and in which there are associated with said parts respective passage means providing fluid communication therebetween comprising an annular race on one of the parts, a plurality of freely rotatable balls retained in annular array in said race defining a substantially circular space therebetween, a pivot fixed to the other part having a spherical working surface tangential to all of said balls, said pivot having a bore therethrough in alignment with said space, a tube secured solely in said bore adapted to provide fluid communication between the respective passage means through the bearing assembly.

2. A bearing assembly for supporting a rotatable part on a relatively fixed part and in which passage means are respectively associated with the parts for providing fluid communication therebetween comprising an annular race mounted on one of the parts, a plurality of freely rotatable balls retained in annular array in said race defining a substantially circular space therebetween, a sphere tangential to all of said balls, a socket for non-rotatably receiving said sphere mounted in the other part, said sphere having a bore in alignment with said space, a tube secured solely in said bore to provide fluid communication between the respective passage means through the bearing assembly.

3. A bearing assembly for supporting a rotatable part on a relatively fixed part and in which passage means are respectively associated with the parts for providing fluid communication therebetween comprising an annular race mounted on one of the parts, a plurality of freely rotatable balls retained in annular array in said race defining a substantially circular space therebetween, a socket member mounted on the other part, said member having a bore in fluid communication with the passage means of said other part, said member having a recess confronting said balls, a spherical element secured in said recess in rotatable contact with said balls, said element having a bore coaxial with said first bore, and a tube extending through both bores and secured therein for fluid communication between the respective passage means through said circular space.

References Cited in the file of this patent
UNITED STATES PATENTS

| | | |
|---|---|---|
| 1,647,419 | Tanner | Nov. 1, 1927 |
| 2,276,734 | Meredith | Mar. 17, 1942 |
| 2,351,890 | Turner | June 20, 1944 |
| 2,809,029 | Christoph | Oct. 8, 1957 |